United States Patent [19]

Powers et al.

[11] 4,245,060

[45] Jan. 13, 1981

[54] FUNCTIONAL GROUP CONTAINING CYCLIC DIOLEFIN BUTYL RUBBERS

[75] Inventors: Kenneth W. Powers, Berkeley Heights; Robert Roper, Summit; Martin L. Gorbaty, Fanwood, all of N.J.

[73] Assignee: Exxon Research & Engineering Co., Florham Park, N.J.

[21] Appl. No.: 931,329

[22] Filed: Aug. 7, 1978

Related U.S. Application Data

[62] Division of Ser. No. 784,656, Apr. 4, 1977, abandoned.

[51] Int. Cl.$^3$ .............................. C08F 8/22; C08F 8/46
[52] U.S. Cl. ................................ 525/256; 525/103; 525/333; 525/344; 525/350; 525/355; 525/356; 525/359; 525/386; 526/308
[58] Field of Search ............... 525/256, 333, 344, 355, 525/359, 356, 386, 103, 350; 526/308

[56] References Cited

U.S. PATENT DOCUMENTS

| | | | |
|---|---|---|---|
| 3,808,177 | 4/1974 | Thaler et al. | 526/308 |
| 3,856,763 | 12/1974 | Thaler et al. | 526/308 |
| 3,900,532 | 8/1975 | Dietrich et al. | 525/256 |
| 3,928,297 | 12/1975 | Thaler et al. | 526/308 |
| 3,954,912 | 5/1976 | Werner et al. | 526/308 |
| 4,031,300 | 6/1977 | Thaler et al. | 526/308 |
| 4,129,557 | 12/1978 | Kudo et al. | 526/308 |
| 4,145,490 | 3/1979 | Harris et al. | 525/386 |
| 4,151,343 | 5/1979 | Thaler et al. | 526/308 |
| 4,153,773 | 5/1979 | Buckley et al. | 526/308 |

FOREIGN PATENT DOCUMENTS

| | | | |
|---|---|---|---|
| 1396141 | 3/1965 | France | 526/308 |
| 1062266 | 3/1967 | United Kingdom | 526/308 |

*Primary Examiner*—William F. Hamrock
*Attorney, Agent, or Firm*—H. E. Naylor; J. J. Mahon

[57] ABSTRACT

Isobutylene-based elastomers containing 3–15 mol percent enchained cyclic diolefin such as cyclopentadiene, and other comonomers such as isoprene, piperylene and butadiene to allow for chemical modification with anhydride, carboxy, hydroxy, etc. to produce a one package through cure system.

35 Claims, 2 Drawing Figures

FUNCTIONAL GROUP CONTAINING CYCLIC DIOLEFIN BUTYL RUBBERS

This is a division, of application Ser. No. 784,656, filed Apr. 4, 1977, now abandoned.

BACKGROUND OF THE INVENTION

This invention relates to isobutylene-based polymers containing enchained cyclic diolefin moieties as well as certain functional groups which allow chemical and/or physical through curing, while the surface may be air dried owing to the cyclic unsaturation.

Isobutylene-based polymers containing relatively low (less than about 10%) enchained cyclic diolefin and exhibiting excellent ozone resistance are well known in the art. See U.S. Pat. Nos. 2,577,822, 2,521,359, 2,626,940 and 3,903,039. Isobutylene-based polymers containing greater than 10 mol percent cyclic diolefin are also known in the art. See U.S. Pat. No. 2,521,359 and *Ind. Eng. Chem. Prod. Res. & Dev.* 10, 279(1971). Also see U.S. Pat. No. 3,497,129 which discloses a non-elastomer cyclic diolefin-containing air dryable coating.

Although the above-mentioned polymers have been known for a number of years, they have never been commercialized, partly owing to polymerization problems such as reactor fouling, poor catalyst efficiency, difficulties in handling the reactive cyclic diolefins and their severe molecular weight depressing effect; but the major reason for their lack of commercialization has been that attractive properties for practical applications have not been developed.

Butyl-type polymers in general possess many desirable properties for surface coatings. For example, they have low permeability, excellent chemical resistance, good environmental resistance, low water absorption, permanent flexibility and low surface energy to provide good substrate wetting and physical adhesion. Despite these properties, low molecular weight butyl-type polymers have had limited commercial success owing to: (1) they can only be used in a two part system (i.e., chemical curatives are required); (2) the only ambient condition cure system available is based on quinoid compounds which produce a dark color and are staining so that ambient cured light colored coatings are not possible; and (3) the coatings have a relatively high degree of surface tack and become even tackier during exposure so that high dirt pick-up is always encountered. Despite extensive work of researchers with both cyclic and acyclic butyl-type polymers the desired combination of properties has heretofore never been realized.

SUMMARY OF THE INVENTION

It has surprisingly been found that a tack-free, air dryable, highly attractive elastomeric coating can now be produced by first preparing a butyl-type polymer containing cyclic diolefin moieties as well as olefinic residues or styrene moieties. Specific functional groups are then introduced which will allow for a one package, ambient-condition self-cure to provide a through-cured, light colored, non-tacky elastomeric coating. While one-package cure systems are preferred for most applications, these polymers can also be cured by addition of a curative, and therefore, can also be utilized as a two-package cure system.

The polymers of the instant invention are suitable for use as coatings, sealants, mastics, caulks, etc.

BRIEF DESCRIPTION OF THE DRAWINGS

The present invention will be further illustrated by reference to the drawings in which.

DETAILED DESCRIPTION

Polymers suitable for use in the instant invention are isobutylene-based elastomeric polymers containing from about 3 to 15 mol %, preferably about 5 to 9 mol % enchained $C_5$–$C_{12}$ cyclic diolefins and from about 0.5 to 30 mol % preferably about 0.5 to 10 mole %, most preferably about 0.5 to 5 mole % of other monomers capable of producing olefinic residues or styrene moieties into the backbone of the resulting polymer. Non-limiting examples of such cyclic diolefins include cyclopentadiene, mono- or poly alkylated (where the alkyl groups contain less than 6 carbon atoms) cyclopentadienes such as methyl and ethyl cyclopentadiene, 1,3-cyclohexadiene and alkylated (where the alkyl groups contain less than 6 carbon atoms) analogs, and other materials capable of being incorporated as a cyclic olefin, such as $\beta$-pinene.

Other monomers polymerized into the isobutylene/cyclic diolefin system are selected depending on desired properties conventionally known in the art. Non-limiting examples of such other monomers suitable for use in the instant invention are:

Conjugated diolefins represented by the formula where each R may be independently hydrogen, an acyclic, or alicyclic hydrocarbon radical having from 1 to 12 carbon atoms, preferably alkyl radicals having from 1-6 carbon atoms. Non-limiting examples of such diolefins include isoprene, butadiene, piperylene, 2,3-dimethyl butadiene, 2-phenyl butadiene 1,3; 2-methyl hexadiene 1,3; vinyl cyclohexenes.

Non-conjugated diolefins:

where $n=1\rightarrow 4$, $m=0\rightarrow 4$ and the R's are defined as above, such as: 2-methyl 1,4 pentadiene; 2-methyl 1,4-hexadiene; 2,3-dimethyl 1,5-heptadiene, etc.

Styrene or substituted styrenes or $\alpha$ methyl styrenes where $R^1=H$ or $CH_3$ and R is defined as above, such as: styrene, $\alpha$-methyl styrene, p-methyl styrene, p-t-butyl styrene, etc.

These other monomers allow for chemical modification by introduction of specific functional groups thereby creating a desirable one package through cure system. It is preferable that the other monomer or monomers be chosen such that they be incorporated as a Type II olefinic residue as opposed to a Type IV olefinic residue such as is present in conventional butyl rubber. The Type II olefinic residue is less sterically hindered and more reactive than the Type IV olefinic residue, although for some purposes Type IV or Type V olefin residues are suitable. Examples of what is meant by Type II, Type IV and Type V olefinic residue is illustrated below and is based on the Boord Classification described by Schmidt and Boord in J.A.C.S. 54, 751 (1932).

Type II olefinic residue as from using butadiene as the diene.

Type IV olefinic residue as from using isoprene as the diene.

Type V olefinic residue $R_2C=CR_2$ as from using dimethyl butadiene as the diene.

Thus, polymers are prepared by incorporating into the isobutylene/cyclic diolefin polymer backbone moieties with Type II olefinic structures, through proper selection of the diolefin or by introducing an aromatic nucleus through the use of styrene-based monomers. The desired functional groups to impart the desired through cure characteristics can be subsequently easily introduced utilizing conventional organic chemical reactions.

The polymers of the instant invention contain from about 60 to 96 mol % preferably about 85 to 95 mol % isobutylene; from about 3 to 15 mol %, preferably about 5 to 9 mol % of cyclic diolefin; and from about 0.5 to 30 mol %, preferably about 0.5 to 5 mol % of other monomer discussed above. The viscosity average molecular weight of the resulting polymers of this invention are from about 10,000 to 700,000, preferably about 15,000 to 80,000 and more preferably about 20,000 to 50,000. The polymers of the instant invention may be prepared by conventional polymerization techniques, such as, cationic polymerization in homogeneous or heterogeneous (cement suspension) systems.

Functional groups are introduced by reacting the isobutylene/cyclic diolefin-based copolymer with various compounds selected from the non-limiting group consisting of maleic anhydride, chlorohydrins, peracids, and sulfuric acid. Preferred are maleic anhydride or peracids. Other conventional olefinic reactions are also suitable, such as: halogenation, addition of nitrosyl chloride, "OXO" reaction, "ene" reaction with formaldehyde, addition of trichlorosilane, "Prins" reaction, oxidative hydrolysis via MnO- or OsO4- catalyst, addition of mercapto acids or alcohols etc.

It is important to note that reactions chosen to introduce the desired functional group must be chosen to be compatible with the reactive olefin or aromatic nucleus introduced into the polymer backbone during polymerization. Sufficient cyclic diolefin functionality must remain after the chemical modification reaction to permit oxidative surface curing in order to produce a nontacky surface. The most desirable functional groups are those which are known to permit "one package" through cures at ambient conditions without undesirable side reactions or color. These functional groups are preferably anhydride, carboxy, hydroxy, silane, mercapto, and sulfonic acid, although other functional groups such as epoxy, halogen, etc. may be desirable and useful in certain applications.

The essence of the instant invention described herein is the concept of combining the oxidative surface cure provided by cyclic diolefins with a desired one package preferably ambient-condition through cure and desirable adhesion characteristics provided by the introduction of selected functional groups. This invention may best be illustrated by the following non-limiting examples.

EXAMPLE 1

A typical low molecular weight butyl polymer was prepared by copolymerizing isobutylene and isoprene according to the methods of U.S. Pat. No. 3,562,804 incorporated herein by reference. The polymer had an $\overline{M}v$ of 32,000 and an INOPO of 28; it contained 4.1 mole % isoprene. INOPO represents the iodine number, the procedure for which is taught in Industrial and Chemical Engineering, 17, 367, (1945). A coating masterbatch was prepared by mixing together the following ingredients to give a uniform coating composition:

| Polymer | 100 parts |
|---|---|
| Toluene | 24 parts |
| Calcene TM[1] | 30 parts |
| Hi Sil 233[2] | 10 parts |
| Titanium Dioxide | 10 parts |
| Stearic Acid | 1 parts |
| Zinc Oxide | 5 parts |

[1] A calcium silicate
[2] A hydrated silica

The masterbatch was divided into aliquots, compounded with various amounts of curatives, and then cast into films and cured for evaluation as an elastomeric coating. The curative system in each case consisted of 7.5 phr of PbO2 added as a paste in dibutyl phthalate and varying amounts of paraquinone dioxime (GMF). This curative system was used in all formulations since it is the only one known to be capable of curing low molecular weight isoprene butyls at ambient conditions. The cast films were cured for 7 days at room temperature followed by 7 days at 158° F. to yield fully cured films for evaluation. Measured physical properties at various GMF levels are tabulated below:

| GMF (phr) | 1.5 | 3.0 | 6.0 |
|---|---|---|---|
| Tensile, psi | 190 | 240 | 255 |
| Elongation, % | 660 480 | 400 | |

The cured films were resilient with acceptable physical properties and showed good through cure as shown by low extractability in solvents. However, in spite of the use of white pigments to try to achieve a light colored coating, they were all fairly dark brown in color owing to the curatives and all films showed a high degree of surface tackiness. They all showed a very high degree of dirt pick up during outdoor exposure testing and were generally aesthetically unattractive as coatings. The surface of the films also tended to soften and become even more tacky during exposure to further negate usefulness in exposed coatings where aesthetic appeal is necessary.

Attempts to overcome the disadvantageous properties of these coatings by compounding with other fillers and additives proved largely futile.

EXAMPLE 2

A series of low molecular weight butyl polymers were prepared by copolymerizing isobutylene with varying amounts of isoprene to determine whether raising the unsaturation level would enable non-discoloring ambient temperature cure systems to be used and would diminish the tackiness and dirt pick up problems. The polymers were synthesized with an $\overline{M}v$ of about 20,000 and with INOPO's ranging from 8 to 30 (corresponding to mole % isoprene ranging from 1.2 to 4.5). Polymers of significantly higher INOPO are difficult to prepare with isoprene as the diene because butyls produced at higher isoprene contents are branched and contain gel (cross-linked polymer). These high isoprene butyls cause rapid reactor fouling during polymerization and are unattractive in coatings because of the high gel content.

None of these polymers were curable at ambient temperature with any of the typical non-staining curative systems which are used in other commercial elastomeric coatings; therefore all coatings evaluations were confined to the quinoid (GMF) cure system. Our studies showed that further increases in unsaturation, beyond a minimum unsaturation required to allow network development to occur during cross-linking, were of little or no benefit to improving either the properties or the performance of the polymers in coatings. Physical properties of vulcanized films prepared from this series of polymers and cured to a constant elongation at break of 400%, by adjusting the GMF level, are tabulated below:

| PHYSICAL PROPERTIES OF VULCANIZATES CURED TO 400% ELONGATION-AT-BREAK | | | | |
|---|---|---|---|---|
| INOPO | Mole % Isoprene | Tensile, psi | 200% Modulus psi | Surface Tack |
| 8.6 | 1.25 | 122 | 25 | |
| 12.9 | 1.9 | 109 | 22 | |
| 14.9 | 2.2 | 122 | 24 | all |
| 18.0 | 2.7 | 124 | 25 | very |
| 20.6 | 3.0 | 117 | 23 | tacky |
| 26.7 | 4.0 | 116 | 26 | |
| 28.4 | 4.2 | 119 | 29 | |
| 29.9 | 4.3 | 116 | 27 | |
| 30.2 | 4.5 | 120 | 27 | |

Raising the unsaturation level enabled vulcanization to be effected at a lower curative level but did not improve physical properties at a fixed elongation-at-break and did not diminish surface tackiness or tack development and dirt pick up during outdoor exposure. Tackiness and high dirt pick up persisted even when the more highly unsaturated polymers were cured to a tighter network (with too low an elongation for most elastomeric coating applications) by using higher levels of GMF.

These examples show that a conventional isoprene type low molecular weight butyl rubber does not lead to a non-tacky, ambient condition, through-cure system and is unable to produce aesthetically attractive, light colored, durable elastomeric coatings.

Similar results were obtained with butadiene, piperylene, dimethyl butadiene, and other similar dienes as the comonomer showing that conventional low molecular weight butyls are not suitable for those coating applications where low dirt pick up and aesthetic appeal are required.

EXAMPLE 3

Since conventional low molecular weight butyl rubbers were not suitable as light colored, low dirt pick up elastomeric coatings, a series of functional group-containing low molecular weight butyl rubbers were prepared. This was done by introducing functional groups, into conventional butyl rubber by use of various reagents. These functional group-containing butyl rubbers were then evaluated as elastomeric coatings. In particular chlorine was introduced into a low molecular weight isoprene butyl rubber by the methods taught in U.S. Pat. No. 2,944,578. These functional group-containing isoprene butyl rubbers were formulated into coating compositions, applied, and evaluated to determine whether aesthetically attractive and durable elastomeric coatings could be prepared. The results, as summarized for chlorine below, show that by introducing other functional groups, light-colored, cured, elastomeric coatings can be prepared. unfortunately this nevertheless, does not overcome the tackiness and dirt pick up problems. Hence, simple functional group-containing conventional butyl rubbers are also not suitable for coating applications where low dirt pick up and aesthetic appeal are required.

Chlorinated low molecular weight butyl as an Elastomeric Coating

The low molecular weight isobutylene/isoprene copolymer of Example 1 with an $\overline{M}v$ of 32,000; an INOPO of 28; and containing 4.1 mole % isoprene was chlorinated by the methods of U.S. Pat. No. 2,944,578 to yield a modified low molecular weight butyl rubber containing 3.1 wt. % chlorine, hereinafter referred to as LM Chlorobutyl.

This LM Chlorobutyl was readily cross-linkable at room temperature with a variety of cure systems as shown below:

| | GUM CURES OF LM CHLOROBUTYL AT ROOM TEMPERATURES | | | | | |
|---|---|---|---|---|---|---|
| | Cure System | | | | | |
| | 1 | | 2 | | 3 | |
| | LM Chlorobutyl | | LM Chlorobutyl Butyl Tin trichloride | | LM Chlorobutyl | |
| | Dibutyl Tin | 100 parts | | 100 parts | Oxydibenzyl | 100 parts |
| | Sulfide | 6 | Dibutyl Tin | 5 | Mercaptan | 9 |
| Cure Time (Days) @ R.T. | SnCl$_2$ . 2H$_2$O | 5 | Sulfide | 4 | SnCl$_2$ . 2H$_2$O | 5 |
| | 1 | 19 | 1 | 19 | 1 | 19 |
| 100% Mod. psi | 20 | | 120 | 230 | — | 50 | — |

-continued

GUM CURES OF LM CHLOROBUTYL AT ROOM TEMPERATURES

| | Cure System | | | | | |
|---|---|---|---|---|---|---|
| | 1 | | 2 | | 3 | |
| | LM Chlorobutyl Dibutyl Tin Sulfide | 100 parts 6 | LM Chlorobutyl Butyl Tin trichloride Dibutyl Tin Sulfide | 100 parts 5 4 | LM Chlorobutyl Oxydibenzyl Mercaptan | 100 parts 9 |
| Cure Time (Days) @ R.T. | $SnCl_2 \cdot 2H_2O$ | 5 1 19 | | 1 19 | $SnCl_2 \cdot 2H_2O$ | 5 1 19 |
| Tensile Strength, psi | 40 | 410 | 680 | 700 | 140 | 830 |
| Elongation, % | 1400 | 29 | 290 | 60 | 290 | 80 |

Good elastomeric networks were readily achieved and cure rate was readily controlled by varying the curatives; however, all the cured films were very tacky. A series of filler loaded films were prepared using cure system (2) to determine whether physical properties and tackiness of the filled films would be attractive for elastomeric coatings. The formulation used for this series of tests was:

| | |
|---|---|
| LM Chlorobutyl | 100 parts |
| Filler | as shown |
| Butyl Tin Trichloride | 5 |
| Dibutyl Tin Sulfide | r |

The formulations were prepared in a Baker Perkins mini-kneader and pressed into 20 mil pads for curing and evaluation. Pads were cured for 15 minutes at 195° F. which tests showed was sufficient to develop a fully cured network. Results are summarized below:

FILLED LM CHLOROBUTYL VULCANIZATES

| Filler | PHR | Tensile Strength psi | Elongation,% | Tackiness |
|---|---|---|---|---|
| Atomite[1] | 50 | 200 | 290 | |
| Asbestine 325[2] | 50 | 275 | 230 | |
| Whitetex Clay | 50 | 250 | 230 | All |
| McNamee Clay | 50 | 240 | 280 | very |
| Purecal U[3] | 50 | 420 | 340 | tacky |
| Mistron Vapaor Talc | 50 | 500 | 310 | |
| Suprex Clay | 50 | 410 | 340 | |
| Hi Sil 233 | 40 | 800 | 360 | |

[1]Calcium carbonate
[2]a short-fibered asbestos filler
[3]calcium carbonate

The filled vulcanizates were all light-colored and possessed acceptable physical properties for elastomeric coatings, but all were very tacky. Tackiness was not eliminated by increasing the filler loading until the loading was so high that the films became weak, cheesy, and non-elastomeric.

When solvent-based coatings were formulated from this LM Chlorobutyl and evaluated, similar results were realized. At modest filler loadings the coatings were tough, white and elastomeric but were tacky and showed high rates of dirt pick up. At higher loadings they became weak and cheesy with high rates of chalking. It was not possible to achieve the desired goal of a non-tacky tough coating which would make an aesthetically attractive, durable, elastomeric coating.

This work shows that simply introducing functional groups into conventional butyls does not overcome all the problem areas noted and does not enable the desired elastomeric coatings to be produced. In particular the introduction of functional groups does not satisfactorily eliminate the inherent tackiness and dirt pick up properties of conventional butyls.

EXAMPLE 4

Figure 1:
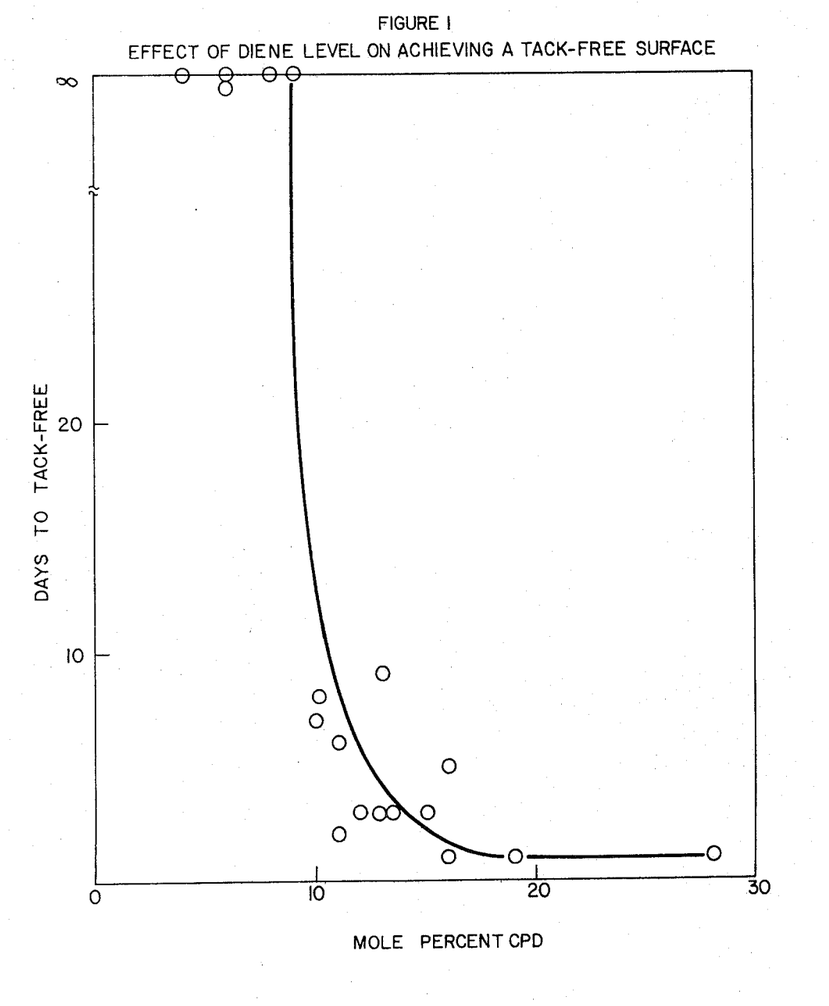
FIG. 1 shows the effect of diene level on achieving a tack-free surface.

Since isobutylene copolymers containing certain cyclic dienes were known to cure oxidatively to produce dry non-tacky surfaces, a series of low molecular weight butyl rubbers containing various amounts of cyclopentadiene (CPD) or methyl cyclopentadiene (MCPD) were prepared and evaluated in an effort to develop a butyl copolymer which would be suitable for non-tacky elastomeric coatings with low dirt pick up properties. This series of copolymers were first evaluated to determine the cyclic diene content required to produce a tack-free surface. The copolymers were compounded in the following simple coating formulations: 75 phr Nytal 300, 20 phr Hi-Sil 422, 20 phr $TiO_2$, 1 phr 6% Cobalt Naphthenate, xylene to workable viscosity. The coatings were drawn down on a Mylar film with a 50 mil applicator to yield dry coatings 15–18 mils thick. The coatings were allowed to air cure at ambient conditions in the laboratory and evaluated daily for tackiness. Results of this evaluation are plotted in FIG. 1. The data show that greater than 10 mole % cyclic diene is required to achieve a tack-free surface even with very long exposure and 15 mole % cyclic diene is required to reach the tack-free state within several days of drying. The cut off is quite sharp.

The copolymers containing enough cyclic diene to achieve a tack-free surface were evaluated more completely for suitability in coatings. Typical results of these evaluations are summarized in Tables 1 and 2. An evaluation of CPD Butyl LM coatings as thick (15–18 mil) films is shown in Table 1. The films developed tack-free surfaces relatively quickly but were completely unsuitable as elastomeric coatings. They had low elongations and were generally cheesy being easily broken and scratched off with the fingernail. Furthermore, they were very poorly through-cured as shown by their being 70 to 90% soluble after 14 days curing. Even after 500 hours in the weatherometer the films were still weak, cheesy and non-elastomeric. Further, at the higher CPD contents they showed surface cracking and checking in the weatherometer while remaining soft and cheesy beneath the hard brittle surface. Through-cures were not developed even after 500 hours in the weatherometer.

TABLE 1

PERFORMANCE
OF HIGH UNSATURATION CPD BUTYL LM
IN THICK FILMS

| Sample | A | B | C | D |
|---|---|---|---|---|
| Mv (estimated) | 20,000 | 20,000 | 16,000 | 25,000 |

TABLE 1-continued
PERFORMANCE
OF HIGH UNSATURATION CPD BUTYL LM
IN THICK FILMS

| Sample | A | B | C | D |
|---|---|---|---|---|
| CPD, mole %[c] | 11 | 19 | 19 | 28 |
| IP, mole %[c] | 0 | 0 | 8 | 0 |
| Coating[d]: | | | | |
| Tack-free, days[e] | 2 | <1 | <1 | <1 |
| Tensile, psi[f] | 145 | 150 | 76 | 81 |
| Elongation %[f] | 69 | 15 | 48 | ~30 |
| Percent Insolubles[f] | 24 | 30 | 34 | 10 |
| 500 Hr. Weatherometer Exposure[g] | | | | |
| Tensile, psi | 340 | 187 | 212 | 187 |
| Elongation, % | 48 | 50 | 61 | ~50 |
| Film Appearance | Cheesy | Cracks, Cheesy | Checking, Cheesy | Cheesy, V.soft Below Surface |

[c]By NMR. IP = Isoprene CPD = Cyclopentadiene
[d]Coating Formulation: 150 phr Nytal 300, 20 phr Titanox RANC, 1 phr 6% Cobalt Naphthenate, 127-240 phr Xylene (for brushing consistency).
[e]Air cured at ambient laboratory conditions.
[f]Coating drawn down on Mylar with 50 mil applicator to give dry thickness of 15-18 mils. Microtensiles pulled after 14 days, at 10 in./min. Films are not elastomeric.
[g]Sunshine arc, 102 min. dry, 18 min. spray.

Figure 2:
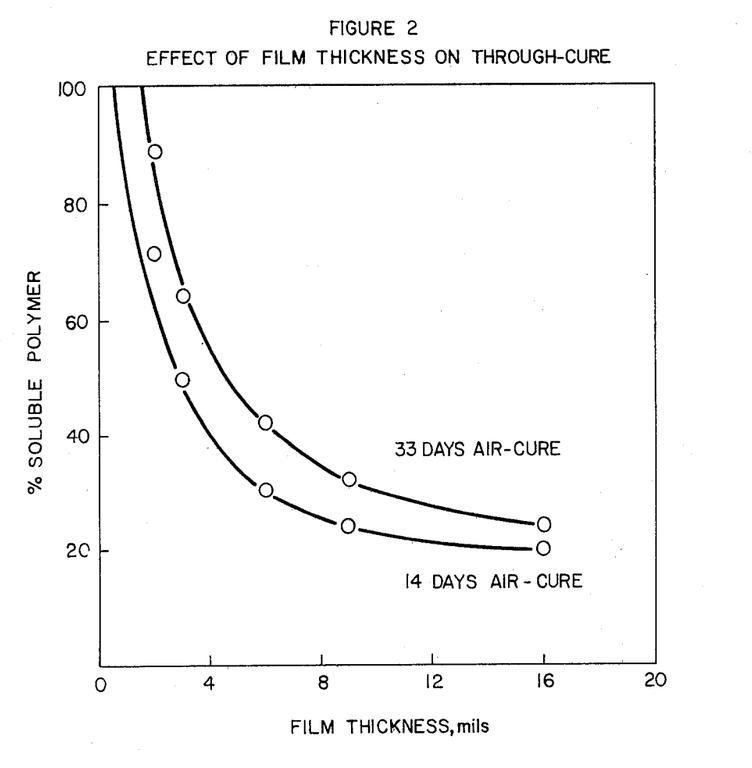
FIG. 2 shows the relationship of film thickness to through-cure.

Results of this thick-film evaluation showed that the CPD-containing butyls are not desirable as elastomeric coatings and that lack of through-cure may be at least partly responsible for their poor properties. A study was therefore made with coatings prepared from a Butyl LM polymer with 13 mole % CPD to determine how the extent of crosslinking depends upon film thickness. Films were drawn down at various thicknesses and then tested for solubility after 14 and 33 days air-cure at ambient conditions. The data summarized in FIG. 2 show that the CPD-containing polymers do not through-cure. Percent insoluble polymer is strongly dependent upon film thickness and even after long exposure only the surface of the films is crosslinked. Thus thin films with a high surface/volume ratio are largely insoluble while the thicker films with more non-surface volume remain largely uncured. The thin films become hard and brittle while the thicker films develop a hard surface, but remain soft and cheesy underneath. Apparently oxygen is not able to diffuse through the cured surface layer of these films to effect a through-cure.

TABLE 2
PERFORMANCE
OF HIGH UNSATURATION CPD BUTYL LM
IN THIN FILMS

| | Coating[a] | | | |
|---|---|---|---|---|
| | A | B | C | D |
| Hardness[b], 10 Month Cure | 5B | 2B | B-2B | 4B |
| Color | Yellow | Yellow | Yellow | White |
| Outdoor Exposure[c] | | | | |
| Dirt Pickup Resistance | | | | |
| 1.3 Mo. | Fair Good | Good | Good | |
| 3.5 Mo. | Poor Good | Good | Good | |
| 6 Mo. | Poor | Good | Good | Good |
| Chalking | | | | |
| 3.5 Mo. | None | Medium | Medium | Medium |
| 6 Mo. | None | Medium | Medium | Medium |
| 10 Mo. | None | Medium | — | Medium |
| Hardness[d], 6 Mo. | Fair Good | Good | V.Good | |
| Weatherometer Exposure[e] | | | | |
| Chalking | | | | |
| 500 hrs. | None | None | None | Medium |
| 730 Hrs. | None | Light | Medium | Heavy |
| 1730 Hrs. | Heavy | Heavy | Heavy | Heavy |

[a]The polymers used in these coatings and their propertiesare shown in Table 1.
[b]Pencil hardness, 10 month curing indoors.
[c]In Linden, N.J., 45°, South, starting in May, 1971.
[d]Resistance to fingernail scratch.
[e]Sunshine arc, 102 min. dry, 18 min. spray.

Although this work shows that the CPD-butyls are obviously unattractive as thick elastomeric coatings, a further evaluation was conducted with the same coatings discussed in Table 1 but this time as thin paint films where good through cure could be expected because of the very high surface to volume ratio. Results of this thin film evaluation are summarized in Table 2. The copolymers were also unattractive as thin paint films. At low CPD content the film remained fairly soft and showed high dirt pick up, but was fairly resistant to chalking. At the higher CPD levels, dirt pick up resistance was improved but chalking became severe. None of the coatings were elastomeric.

Clearly the CPD-containing copolymers are unacceptable for exposed elastomeric coatings with low dirt pick up and aesthetic appeal. Similar conclusions were drawn from evaluation of MCPD-containing copolymers or from terpolymers containing isoprene, isobutylene and cyclic diene.

EXAMPLE 5

Although higher molecular weight polymers are less attractive in solvent based coatings because they require too much dilution with solvent to reduce viscosity to a workable level, a series of cyclic diene-containing butyl rubbers with 2 to 3 times the molecular weight of those evaluated in Example 4 were prepared and evaluated to see if better coating properties could be achieved with the higher molecular weight polymers. Evaluations on these higher molecular weight polymers are summarized in Table 3.

TABLE 3
PERFORMANCE OF CPD AND MCPD POLYMERS IN AIR-DRY COATINGS[a]
(THICK FILMS)

| Polymer Composition Mole % | | | Tack | | Cure after 14 Days Air-Dry | | | |
|---|---|---|---|---|---|---|---|---|
| CPD | IP | Mv | 2 days | 13 days | Tensile, psi | % E | % Insolubles | Comments |
| 13 | 0 | 40,000 | Slight | None | 169 | 68 | 11 | |
| 13 | 0 | 64,000 | None | None | 284 | 58 | 20 | |

TABLE 3-continued
PERFORMANCE OF CPD AND MCPD POLYMERS IN AIR-DRY COATINGS[a]
(THICK FILMS)

| Polymer Composition Mole % | | | Tack | | Cure after 14 Days Air-Dry | | | |
|---|---|---|---|---|---|---|---|---|
| | IP | $\overline{\text{M}}$v | 2 days | 13 days | Tensile, psi | % E | % Insolubles | Comments |
| 13 | 4 | 56,000 | None | None | 278 | 78 | 22 | All |
| MCPD | | | | | | | | films |
| 7 | 4 | 48,000 | Very Slight | Almost none | 72[d] | 45[e] | 7 | cheesy and |
| 8 | 0 | 72,000 | Very Slight | Almost none | 136[d] | 60[e] | 6 | not |
| 9 | 5 | 52,000 | Very Slight | Almost none | 122[d] | 50[e] | 8 | elastomeric |

[a]75 phr Nytal 300, 20 phr Hi-Sil 422, 20 phr TiO$_2$, 0.06 phr Cobalt (as metal). Dry film thickness was about 15 mils.
[d]Tensile at yield point
[e]Elongation at yield point.

No significant improvement in the coatings resulted from increasing the molecular weight. The films become tack-free or nearly so but were not elastomeric. As thick films they remained soft and cheesy with a hard surface layer—and they showed poor through-cure characteristics as evidenced by the high solubles content. They also performed poorly when evaluated as thin paint films. After 20 weeks air-dry indoors the films were still cheesy and easily broken with a fingernail. After 6 months outdoor exposure the films were becoming brittle and were chalking badly. Clearly these non-functional group containing cyclic diene butyls are unacceptable as elastomeric coatings.

Examples 1–5 show that one is not able to achieve the desired aesthetically attractive non-tacky, tough, durable and elastomeric coatings with conventional butyl rubbers, with functionalized conventional butyl rubbers, or with isobutylene/cyclic diolefin copolymers containing only olefinic functionality. None of these polymers is capable of giving a non-tacky surface and a good elastomeric through-cure at the same time so that substantial efforts to develop the desired elastomeric coatings based upon these polymers have always fallen short of the goal.

EXAMPLE 6

A terpolymer was prepared from cyclopentadiene, isoprene, and isobutylene. This had an $\overline{\text{M}}$v of 26,500 and contained 6 mole percent CPD and 7 mole percent isoprene. 136 g. of this polymer was treated with 11.7 g. of maleic anhydride and heated with agitation for 15 hours at 185° C. The product was dissolved in toluene to form a 50% cement, and this was centrifuged to remove unreacted maleic anhydride.

The product had an $\overline{\text{M}}$v of 27,800 and contained 2.2 mole percent anhydride groups according to the saponification number.

A zinc oxide paste was prepared by dispersing 500 g. ZnO (Protox 166) with 237.5 g. Varsol 18 and 12.5 g. of an 80% Butyl ML 430 cement in toluene, in a pebble mill. The 50% solution of the maleic anhydride adduct was then compounded as follows:
  16.3 g. 50% solution of maleic anhydride adduct in toluene.
  2.8 g. ZnO paste
  0.9 g. Varsol #2[1]
  0.28 g. Tributylamine

[1]. A commercial hydrocarbon solvent having a boiling range of 326° F. to 393° F.

These ingredients were mixed together to form a uniform coating. A 15-mil (dry film thickness) film was cast and allowed to cure at ambient conditions (75° F., 60% Rel. Hum.). This film cured overnight, resulting in a white, elastomeric coating. Tensile properties measured periodically are as follows:

| Days Cured | 3 | 8 | 15 |
|---|---|---|---|
| Tensile, psi | 260 | 360 | 400 |
| Elongation, % | 150 | 140 | 160 |

The surface of the film was essentially tack-free after 2 days. The film had acceptable physical properties for an elastomeric coating and was white and tack-free with a good through cure.

EXAMPLE 7

A cement consisting of 33.1 g. of a terpolymer of isobutylene, isoprene (5.8 mole %) and cyclopentadiene (7.3 mole %), 33.1 g. Varsol 18 and 10.0 g. of chlorobenzene was treated successively at 85° C. with 0.17 g. Irganox 1010, 2.85 g. of maleic anhydride and 0.33 g. benzoyl peroxide. The temperature was raised to 100° C. and maintained there for 3 hours. After 45 minutes the mixture became extremely viscous and an additional 15 g. Varsol 18 was added.

The polymer was formulated into a coating with ZnO as in Example 1. A film was cast from this coating, which cured overnight at ambient conditions (75° F., 50% rel. hum.). The film was resilient and tack-free as desired for an aesthetically attractive elastomer coating.

EXAMPLE 8

A cement consisting of 50 g. of an isobutylenecyclopentadiene (9.7 mole %) copolymer 135 g. Varsol 18, and 15 g. chlorobenzene was treated successively with 0.25 g. Irganox 1010, 4.3 g. maleic anhydride and 1.5 g. of benzoyl peroxide at 85° C. The temperature was increased to 100° C. and maintained there for 3 hours. A coating, similar to the examples above, cured to give a resilient and tackfree film. High quality elastomer coatings could be prepared with this composition as the binder.

Examples 6–8 show that isobutylene based polymers containing both cyclopentadiene and maleic anhydride functionality are capable of giving a good elastomeric through cure and a dry non-tacky surface simultaneously. These new polymers containing two types of functionality can be formulated to give the desired aesthetically attractive, non-tacky, tough, durable, elastomeric coatings.

EXAMPLE 9

A terpolymer was prepared from methylcyclopentadiene (MCPD), isoprene, and isobutylene. This terpolymer had an $\overline{M}v$ of 55,000; and $\overline{M}n$ (VPO) of 20,000; and an INOPO of 30. It contained about 7 mole % diene by NMR of which ~4 mole % was MCPD. 514 g. of this terpolymer was dissolved in 786 g. of hexane to form 1300 g. of a 43.4% cement and then converted to the chlorohydrin by reacting with freshly prepared hypochlorous acid as follows:

The hypochlorous acid was prepared by bubbling 46.5 g. $Cl_2$ slowly (over the course of 22½ minutes) into 65.5 g. of 50% NaOH in 412 g. of distilled water while stirring @ −10° C. The freshly prepared hypochlorous acid solution was poured slowly into the 1300 g. of cement with rapid stirring in a dispersator stirred vessel while maintaining temperature at 30°–35° C. by adding ice directly to the mixture. Prior to the addition of the hypochlorous acid, the cement had been acidified by the addition of 490 ml. of 1N HCl solution. The mixture was allowed to stir for 30 minutes and then the polymer was recovered by first water washing to deash and then drying under vacuum to remove the solvent and recover the dried modified polymer. The recovered polymer had an $\overline{M}v$ of 50,000, an INOPO of 20, and it contained 3.8 wt. % chlorine and showed a strong hydroxyl absorption in the infrared spectra.

The polymer was compounded with 50 phr of SRF black in a kneader and then 9 phr of toluene diisocyanate(T.D.I.) and 0.2 phr of Arkam were mixed in as curatives and a pad was pressed from the compounded polymer at room temperature. After 6 days at room temperature, stress-strain properties were evaluated. The pad was only slightly tacky and had a tensile of 300 psi with an elongation of 200%. It would be suitable for use as a low tack elastomeric coating. This example shows that an isobutylene-based polymer containing both methyl cyclo-pentadiene and modified to contain hydroxy functionality is capable of giving a good elastomeric through-cure and a dry non-tacky surface simultaneously.

As indicated, this particular polymer containing only 4 mole % methyl cyclopentadiene does not quite develop a non-tacky surface and at filler loadings where it remains elastomeric a slight surface tackiness is detectable. For complete elimination of surface tackiness it is preferred that the cyclic diene content be above 5 mole %. At less than 3 mole % cyclic diene severe surface tackiness and very high dirt pick up is evident. Surface tackiness impressively diminishes as cyclic diene content is increased through the range 3 to 5 mole %. At 4 mole % as for the polymer of this example a slight surface tackiness persists at filler loadings which five an elastomeric film.

EXAMPLE 10

A terpolymer was prepared from cyclopentadiene (CPD), styrene, and isobutylene. This terpolymer had an $\overline{M}v$ of 29,000 and an INOPO of 75. It contained 14.8 mole % CPD and 17.5 mole % styrene by NMR analyses.

710 g. of this polymer was dissolved in 860 g. of toluene to yield 1570 g. of a cement and then converted to the chlorohydrin by reacting with hypochlorous acid formed "in situ" as follows:

70 g. of conc. (37%) HCl was diluted with 210 g. of distilled water and added to the cement in a nitrogen-purged stirred resin flask. Then 80.5 g. of 30% hydrogen peroxide was diluted with 210 g. distilled water and allowed to drop slowly into the cement from a dropping funnel with rapid stirring. After all the $H_2O_2$ was in, the cement was heated to reflux and allowed to stir at reflux (85° C.) for 6 hours. Then 100 g. of 50% NaOH solution was added and the refluxing continued for ½ hour more. The modified cement was cooled, deashed by water washing in a separatory funnel and then the polymer was recovered by being precipitated in IPOH and dried in a vacuum oven at 180° F.

The recovered polymer had an $\overline{M}V$ of 40,000 (some increase in molecular weight had occurred probably due to slight crosslinking during drying). It contained 1.02% chlorine and showed a very strong hydroxyl absorption in the infrared. It was compounded with 50 phr of SRF black as in Example 4 and then 10 phr of T.D.I. and 0.5 phr of Arkam were added as curatives and a pad was pressed from the compounded mixture at room temperature. After 6 days at room temperature, the pad was relatively hard and tack free but still very flexible. It had a tensile strength of 600 psi with an elongation at break of 100%. It would be suitable for use as an elastomeric, tack-free coating, but the elongation of only 100% would be borderline for many applications. The short elongation and increase in molecular weight during drying (incipient cross-linking) are both indicative of excessive functionality. A cyclopentadiene content of 15% is about the upper limit which is desired for elastomeric coatings with reasonably good cured elongation.

This example does show though that isobutylene based polymers containing the proper amount of cyclopentadiene and hydroxy functionality are capable of good elastomeric through-cure while simultaneously developing a dry, non-tacky surface. The hydroxy functionality in the modified polymers of Examples 9 and 10 was actually a chlorohydrin structure. This functionality can be introduced into suitable butyls either by the use of $H_2O_2$/HCl as in Example 10 or by the use of freshly prepared hypochlorous acid as in Example 9. The hydroxy group of the polymeric chlorohydrin structure may be used directly in cross-linking with isocyanates, titanate esters etc. to yield an elastomeric through-cure. Alternately, the chlorine may be replaced with another hydroxyl group, forming a glycol, also amenable to crosslinking with isocyanates, titanate esters, etc.

EXAMPLE 11

A copolymer of cyclopentadiene and isobutylene was prepared. This copolymer had an $\overline{M}v$ of 17,000; and $\overline{M}n$ (VPO) of 8100; and an INOPO of 52. It contained 11 mole % CPD by NMR analyses. 1335 g. of this copolymer was dissolved in 1630 g. of hexane to yield 2965 g. of a 45% cement and then converted to the epoxide derivative as follows:

The cement was chilled with stirring in a nitrogen-purged resin flask to 12° C. and then 89.7 g. of acetic anhydride and 8 g. of 50% sulfuric acid were added with stirring followed immediately by the dropwise addition (over the course of 1 hour) of 199.2 g. of 30% hydrogen peroxide. The mixture was stirred cold for 2 hours and then heated to reflux (at 62° C.) for 2 more hours. It was then cooled and deashed by water washing in a separatory funnel. The washed cement was diluted with toluene and then stripped to a boiling point of 110° C. through a short packed column to remove all water and hexane and yield a 50% solution of the modified polymer in toluene.

A sample of the polymer was recovered by drying the cement in a vac-oven at 180° F. It had an $\overline{M}v$ of 40,000 (some crosslinking occurred during the drying) and had a strong epoxide absorption in the infrared spectrum.

Into a portion of the cement, 4.5 phr of diethylene triamine was stirred and a portion of this compounded cement was capped and stored. It gelled within 6 hours. Another portion of this compounded cement was cast into a film on glass and allowed to dry. It cured overnight to yield a resilient tack-free and insoluble coating which could not be removed from the glass for testing because of the strong adhesion. It would make a very desirable elastomeric coating.

The epoxide used in this example may be prepared by oxidation of the olefin with a peracid such as performic acid, peracetic acid, or m-chloroperbenzoic acid. The epoxides may be reacted with polyols or polyamines to cross-link, or with dilute HCl to form chlorohydrins, or with dilute base to form glycols. This example shows that an isobutylene-based polymer containing cyclopentadiene and modified to contain epoxy groups is capable of giving a good elastomeric through-cure while simultaneously developing a dry non-tacky surface.

EXAMPLE 12

A terpolymer of cyclopentadiene (CPD), isoprene, and isobutylene was prepared. This terpolymer had an $\overline{M}v$ of 19,000 and an INOPO of 47. It contained 5.7 mole % CPD and 4.8 mole % isoprene by NMR analyses. 333 g. of this terpolymer was dissolved in 594 g. of hexane to yield 927 g. of a 36% cement and then converted to the hydroxyl derivative as follows:

The cement was chilled with stirring in a nitrogen-purged resin flask to 13° C. and then 82.7 g. of 20% fuming sulfuric acid (oleum) was added dropwise from a dropping funnel over the course of 25 minutes. The mixture was allowed to warm with stirring to room temperature and then 1500 ml. of distilled water was added along with 500 ml of isopropyl alcohol to break the emulsion that formed and keep the mixture fluid enough to stir. The mixture was heated to reflux at 60° C. and stirred at reflux for ½ hour. It was then cooled and washed with water in a separatory funnel to deash. The polymer was recovered by precipitation from isopropyl alcohol and then drying in a vacuum oven at 180° F. The recovered modified polymer had an $\overline{M}v$ of 15,000 and showed a strong hydroxyl absorption in the infrared.

It was compounded with 50 phr of SRF black in a kneader as in Example 4 and then 7 phr of T.D.I. and 0.25 phr of Arkam were mixed in as curatives and a pad was pressed from the compounded polymer at room temperature. After 6 days at room temperature, stress-strain properties were evaluated. The pad was almost completely tack free with a tensile strength of 180 psi and an elongation of 150%. It would be suitable as an elastomeric tack-free coating in applications requiring a high solids application with only modest strength requirements. The low molecular weight of this modified terpolymer permits formulating into very high solids coatings with good application properties.

Reaction with sulfuric acid followed by hydrolysis in the classical manner introduces a hydroxyl group (i.e., alcohol synthesis from olefins via sulfate ester).

Examples 6 through 13 show that isobutylene-based polymers containing the proper amount of enchained cyclic diolefin (i.e. 3-15 mole %) and modified to contain other functional groups with allow through-curing are capable of simultaneously developing a dry non-tacky surface (through surface oxidative cross-linking of the cyclic unsaturation) and a good elastomeric through-cure. These polymers can be formulated to give very desirable aesthetically attractive, non-tacky, though, durable, and elastomeric coatings.

What is claimed is:

1. A tack-free, air-dryable elastomeric terpolymer having a viscosity average molecular weight of about 10,000 to 700,000 which comprises about 60 to 95 mol % isobutylene, about 3 to 15 mol % $C_5$–$C_{12}$ cyclic diolefin and about 0.5 to 30 mol % non-conjugated diolefin represented by the formula wherein each R may be independently hydrogen or acyclic or alicyclic hydrocarbon radicals having from 1 to 12 carbon atoms, n is an integer from 1 to 4 and m is an integer from 1 to 4, or zero and wherein the terpolymer has attached thereto functional groups selected from the group consisting of anhydride, carboxy, hydroxy, silane, mercapto, epoxy, bromine or chlorine.

2. The terpolymer of claim 1 wherein the viscosity average molecular weight is about 10,000 to 100,000.

3. The composition of claim 1 wherein the cyclic diolefin is cyclopentadiene.

4. The composition of claim 1 wherein the cyclic diolefin is a mono or polyalkylated cyclopentadiene wherein each alkyl group contains less than 6 carbon atoms.

5. The composition of claim 1 wherein the mono or polyalkylated cyclopentadiene is selected from the group consisting of methyl cyclopentadiene, ethyl cyclopentadiene and 1,3-dimethylcyclopentadiene.

6. The composition of claim 1 wherein the terpolymer is comprised of about 85 to 95 mol % isobutylene, about 5 to 9 mol % cyclic diolefin, and about 0.5 to 5 mol % non-conjugated diolefin.

7. The composition of claim 1 wherein the nonconjugated diolefin is selected from the group consisting of 2-methyl-1,4-pentadiene, 2-methyl-1,4-hexadiene, and 2,3-dimethyl-1,5-heptadiene.

8. The composition of claim 6 wherein the cyclic diolefin is cyclopentadiene.

9. The composition of claim 8 wherein the functional group is anhydride.

10. A tack-free, air-dryable elastomeric terpolymer having a viscosity average molecular weight of about 10,000 to 100,000 which comprises about 60 to 95 mol % isobutylene, about 3 to 15 mol % cyclopentadiene and about 0.5 to 30 mol % non-conjugated diolefin selected from the group consisting of 2-methyl-1,4-pentadiene, 2-methyl-1,4-hexadiene, and 2,3-dimethyl-1,5-heptadiene wherein said terpolymer has attached thereto functional groups selected from the group consisting of anhydride, hydroxy, carboxy, silane and mercapto.

11. A tack-free, air-dryable elastomeric terpolymer having a viscosity average molecular weight of about 10,000 to 100,000 which comprises about 60 to 95 mol % isobutylene, about 3 to 15 mol % $C_2$–$C_{12}$ cyclic diolefin and about 0.5 to 30 mol % styrene compound represented by the formula where R' is hydrogen or $CH_3$ and R is hydrogen, or an acyclic or alicyclic hydrocarbon radical having from 1 to 12 carbon atoms and wherein the terpolymer has attached thereto functional groups selected from the group consisting of anhydride, carboxy, hydroxy, silane, mercapto, epoxy, bromine and chlorine.

12. The terpolymer of claim 11 wherein the viscosity average molecular weight is about 10,000 to 100,000.

13. The composition of claim 11 wherein the cyclic diolefin is cyclopentadiene.

14. The composition of claim 11 wherein the cyclic diolefin is a mono or polyalkylated cyclopentadiene wherein each alkyl group contains less than 6 carbon atoms.

15. The composition of claim 11 wherein the styrene compound is selected from the group consisting of styrene, α-methyl styrene, p-methyl styrene, and p-t-butyl styrene.

16. The composition of claim 11 wherein the terpolymer is comprised of about 85 to 95 mol % isobutylene, about 5 to 9 mol % cyclic diolefin, and about 0.5 to 5 mol % conjugated diolefin.

17. The composition of claim 16 wherein the cyclic diolefin is cyclopentadiene.

18. The composition of claim 17 wherein the functional groups are anhydride.

19. A tack-free, air-dryable elastomeric terpolymer having a viscosity average molecular weight of about 10,000 to 100,000 which comprises about 60 to 95 mol % isobutylene, about 3 to 15 mol % cyclopentadiene and about 0.5 to 30 mol % styrene wherein said terpolymer has attached thereto functional groups selected from the group consisting of anhydride, hydroxy, carboxy, silane and mercapto.

20. A method for preparing a tack-free, air-dryable, elastomeric terpolymer which comprises reacting:
(a) an elastomeric terpolymer having a viscosity average molecular weight of about 10,000 to 700,000 and comprising about 60 to 95 mol % isobutylene, about 3 to 15 mol % $C_2$–$C_{12}$ cyclic diolefin and about 0.5 to 30 mol % nonconjugated diolefin represented by the formula wherein each R may be indepently hydrogen or acyclic or alicyclic hydrocarbon radicals having from 1 to 12 carbon atoms, n is an integer from 1 to 4 and m is an integer from 1 to 4, or zero; with
(b) a compound selected from the group consisting of maleic anhydride, chlorohydrin, peracids, sulfuric acid and halogen wherein the halogen is chlorine or bromine.

21. The terpolymer of claim 20 wherein the viscosity average molecular weight is about 10,000 to 100,000.

22. The method of claim 20 wherein the cyclic diolefin is cyclopentadiene.

23. The method of claim 20 wherein the cyclic diolefin is a mono or polyalkylated cyclopentadiene wherein each alkyl group contains less than 6 carbon atoms.

24. The method of claim 20 wherein the mono or polyalkylated cyclopentadiene is selected from the group consisting of methyl cyclopentadiene, ethyl cyclopentadiene and 1,3-dimethylcyclopentadiene.

25. The method of claim 20 wherein the nonconjugated diolefin is selected from the group consisting of 2-methyl-1,4-pentadiene, 2-methyl-1,4-hexadiene, and 2,3-dimethyl-1,5-heptadiene.

26. The method of claim 20 wherein the terpolymer is comprised of about 85 to 95 mol % isobutylene, about 5 to 9 mol % cyclic diolefin, and about 0.5 to 5 mol % conjugated diolefin.

27. The method of claim 26 wherein the cyclic diolefin is cyclopentadiene.

28. A method for preparing a tack-free, air-dryable, elastomeric terpolymer which comprises reacting:
(a) an elastomeric terpolymer having a viscosity average molecular weight of about 10,000 to 700,000 and comprising about 60 to 95 mol % isobutylene, about 3 to 15 mol % $C_2$–$C_{12}$ cyclic diolefin and about 0.5 to 30 mol % styrene compound represented by the formula where R' is hydrogen or $CH_3$ and R is a hydrogen or an acyclic or alicyclic hydrocarbon radical having from 1 to 12 carbon atoms; with
(b) a compound selected from the group consisting of maleic anhydride, chlorohydrins, peracids, sulfuric acid, and halogen wherein the halogen is chlorine or bromine.

29. The terpolymer of claim 28 wherein the viscosity average molecular weight is about 10,000 to 100,000.

30. The method of claim 28 wherein the cyclic diolefin is cyclopentadiene.

31. The method of claim 28 wherein the cyclic diolefin is a mono or polyalkylated cyclopentadiene wherein each alkyl group contains less than 6 carbon atoms.

32. The method of claim 28 wherein the mono or polyalkylated cyclopentadiene is selected from the group consisting of methyl cyclopentadiene, ethyl cyclopentadiene and 1,3-dimethylcyclopentadiene.

33. The method of claim 28 wherein the styrene compound is selected from the group consisting of styrene, α-methyl styrene, p-methyl styrene, and p-t-butyl styrene.

34. The method of claim 23 wherein the terpolymer is comprised of about 85 to 95 mol % isobutylene, about 5 to 9 mol % cyclic diolefin, and about 0.5 to 5 mol % conjugated diolefin.

35. The method of claim 34 wherein the cyclic diolefin is cyclopentadiene.

* * * * *